United States Patent
Aldama et al.

(10) Patent No.: US 11,650,848 B2
(45) Date of Patent: May 16, 2023

(54) ALLOCATING RESOURCES FOR NETWORK FUNCTION VIRTUALIZATION

(71) Applicant: SUSE LLC, Wilmington, DE (US)

(72) Inventors: Ignacio Aldama, Las Rozas (ES); Ruben Sevilla Giron, Las Rozas (ES); Javier Garcia-Lopez, Las Rozas (ES)

( * ) Notice: Subject to any disclaimer, the term of this patent is extended or adjusted under 35 U.S.C. 154(b) by 683 days.

(21) Appl. No.: 16/071,849

(22) PCT Filed: Jan. 21, 2016

(86) PCT No.: PCT/EP2016/051266
§ 371 (c)(1),
(2) Date: Jul. 20, 2018

(87) PCT Pub. No.: WO2017/125161
PCT Pub. Date: Jul. 27, 2017

(65) Prior Publication Data
US 2021/0103471 A1  Apr. 8, 2021

(51) Int. Cl.
*G06F 9/50* (2006.01)
*G06F 9/455* (2018.01)

(52) U.S. Cl.
CPC ........ *G06F 9/5011* (2013.01); *G06F 9/45533* (2013.01)

(58) Field of Classification Search
CPC ........................... G06F 9/5011; G06F 9/45533
See application file for complete search history.

(56) References Cited

U.S. PATENT DOCUMENTS

| | | | |
|---|---|---|---|
| 7,765,307 B1 * | 7/2010 | Kritov | H04L 69/14 709/227 |
| 8,918,490 B1 * | 12/2014 | Rattner | H04L 67/16 709/223 |
| 9,052,935 B1 * | 6/2015 | Rajaa | G06F 9/5077 |
| 9,172,621 B1 * | 10/2015 | Dippenaar | H04L 41/22 |
| 9,350,681 B1 * | 5/2016 | Kitagawa | H04L 41/5096 |
| 9,497,136 B1 * | 11/2016 | Ramarao | G06F 9/5072 |
| 9,749,294 B1 * | 8/2017 | Marquardt | H04L 63/0807 |
| 10,116,571 B1 * | 10/2018 | Bertz | H04L 47/19 |
| 2005/0081208 A1 * | 4/2005 | Gargya | G06F 9/4881 718/100 |
| 2007/0038843 A1 * | 2/2007 | Trivedi | G06F 15/7864 712/34 |
| 2007/0180087 A1 | 8/2007 | Mizote et al. | |

(Continued)

FOREIGN PATENT DOCUMENTS

EP  2940968 A1  11/2015

OTHER PUBLICATIONS

"International Application Serial No. PCT/EP2016/051266, International Search Report dated Oct. 5, 2016", 4 pgs.

(Continued)

*Primary Examiner* — Adam Lee

(57) ABSTRACT

Controlling allocation of resources in network function virtualization. Data defining a pool of available physical resources is maintained. Data defining one or more resource allocation rules is identified. An application request is received. Physical resources from the pool are allocated to virtual resources to implement the application request, on the basis of the maintained data, the identified data and the received application request.

20 Claims, 6 Drawing Sheets

(56) References Cited

U.S. PATENT DOCUMENTS

| | | | | |
|---|---|---|---|---|
| 2008/0147555 A1* | 6/2008 | Cromer | G06F 21/10 | 705/52 |
| 2009/0199285 A1* | 8/2009 | Agarwal | H04L 67/02 | 726/9 |
| 2011/0231696 A1* | 9/2011 | Ji | G06F 11/1484 | 718/1 |
| 2012/0136725 A1* | 5/2012 | Alexander | G06Q 30/0251 | 705/14.66 |
| 2013/0042003 A1* | 2/2013 | Franco | G06F 9/45558 | 709/226 |
| 2013/0073724 A1* | 3/2013 | Parashar | G06F 9/5072 | 709/224 |
| 2013/0160014 A1* | 6/2013 | Watanabe | G06F 9/50 | 718/1 |
| 2013/0185667 A1* | 7/2013 | Harper | G06F 11/0751 | 715/772 |
| 2013/0275975 A1* | 10/2013 | Masuda | G06F 9/45533 | 718/1 |
| 2014/0068056 A1* | 3/2014 | Simitsis | G06F 9/5072 | 709/224 |
| 2014/0270494 A1* | 9/2014 | Sawhney | G06V 10/95 | 382/159 |
| 2014/0278326 A1* | 9/2014 | Sharma | G06F 8/60 | 703/13 |
| 2014/0372167 A1* | 12/2014 | Hillier | G06Q 10/06315 | 705/7.24 |
| 2015/0058459 A1* | 2/2015 | Amendjian | G06F 9/45558 | 709/223 |
| 2015/0135003 A1* | 5/2015 | Cota-Robles | G06F 9/50 | 714/6.3 |
| 2015/0254248 A1* | 9/2015 | Burns | G06F 16/24578 | 707/749 |
| 2015/0331763 A1* | 11/2015 | Cao | G06F 11/0793 | 714/3 |
| 2015/0341223 A1* | 11/2015 | Shen | H04L 41/12 | 709/223 |
| 2016/0203060 A1* | 7/2016 | Singh | G06F 11/00 | 714/19 |
| 2017/0024237 A1* | 1/2017 | Itoh | G06F 9/46 | |
| 2017/0048008 A1* | 2/2017 | Yi | H04B 17/382 | |
| 2017/0118616 A1* | 4/2017 | Kothari | H04W 4/24 | |
| 2017/0228250 A1* | 8/2017 | Wang | G06F 9/45558 | |
| 2017/0324612 A1* | 11/2017 | Perez | H04L 41/0893 | |
| 2018/0253332 A1* | 9/2018 | Andrianov | H04L 41/064 | |

OTHER PUBLICATIONS

"International Application Serial No. PCT/EP2016/051266, Written Opinion dated Oct. 5, 2016", 6 pgs.

* cited by examiner

ALLOCATING RESOURCES FOR NETWORK FUNCTION VIRTUALIZATION

This application is a U.S. National Stage Filing under 35 U.S.C. 371 from International Application No. PCT/EP20161051266, filed Jan. 21, 2016 and published in English as WO 2017/125161 on Jul. 27, 2017, which is incorporated herein by reference in its entirety.

BACKGROUND

Network function virtualization (NFV) is an emerging technology that allows virtualization of the physical networking elements of networks and allows them to work together. This new trend is leveraging information technology (IT) virtualization technology and is also demanding specific behaviors more related to telecommunications company (Telco) environments. One of the more relevant behaviors is resource allocation, as the needs of a router are different from those of a server; for a classical IT application, just an internet protocol (IP) and random access memory (RAM) can be enough, but for a networking application, other parameters such as bandwidth are also relevant

BRIEF DESCRIPTION OF THE DRAWINGS

Various features of the present disclosure will be apparent from the detailed description which follows, taken in conjunction with the accompanying drawings, which together illustrate certain example features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In the IT virtualization world, resources can be summarized mainly as cores (computing power), memory (computing power), storage (storage) and number of networks/ports (networking) and these are the resources that virtualization technologies such as Openstack™ is capable of managing.

For networking applications, the number of TYPES of resources is not only bigger but also is not necessarily a fixed number and also evolves. For example, an edge router may operate with cores, memory, disk and bandwidth and a core router may operate with dedicated RAM, some cores dedicated, some cores shared, a physical port and connection to a virtual local area network (VLAN) instead of a virtual extensible local area network (VXLAN).

Known systems are hardcoded mainly to the IT resources and Telcos do not have the flexibility to adapt those systems to their specifications. Adding new types of resources or try to modify known systems such as Openstack™ to perform something not round-robin-based is difficult, as this would involve coding that affects the root of the Openstack™ behavior (and is therefore extremely risky). Also, the scheduling of Openstack™ is virtual machine (VM) based so it has almost no visibility of an application, groups of applications or customer/users that owns those applications. Also, Openstack™ is very structured in regions, zones and host (a vertical approach) and horizontal grouping, or even worse, mixtures of vertical and horizontal grouping, are extremely limited.

Figure 1:
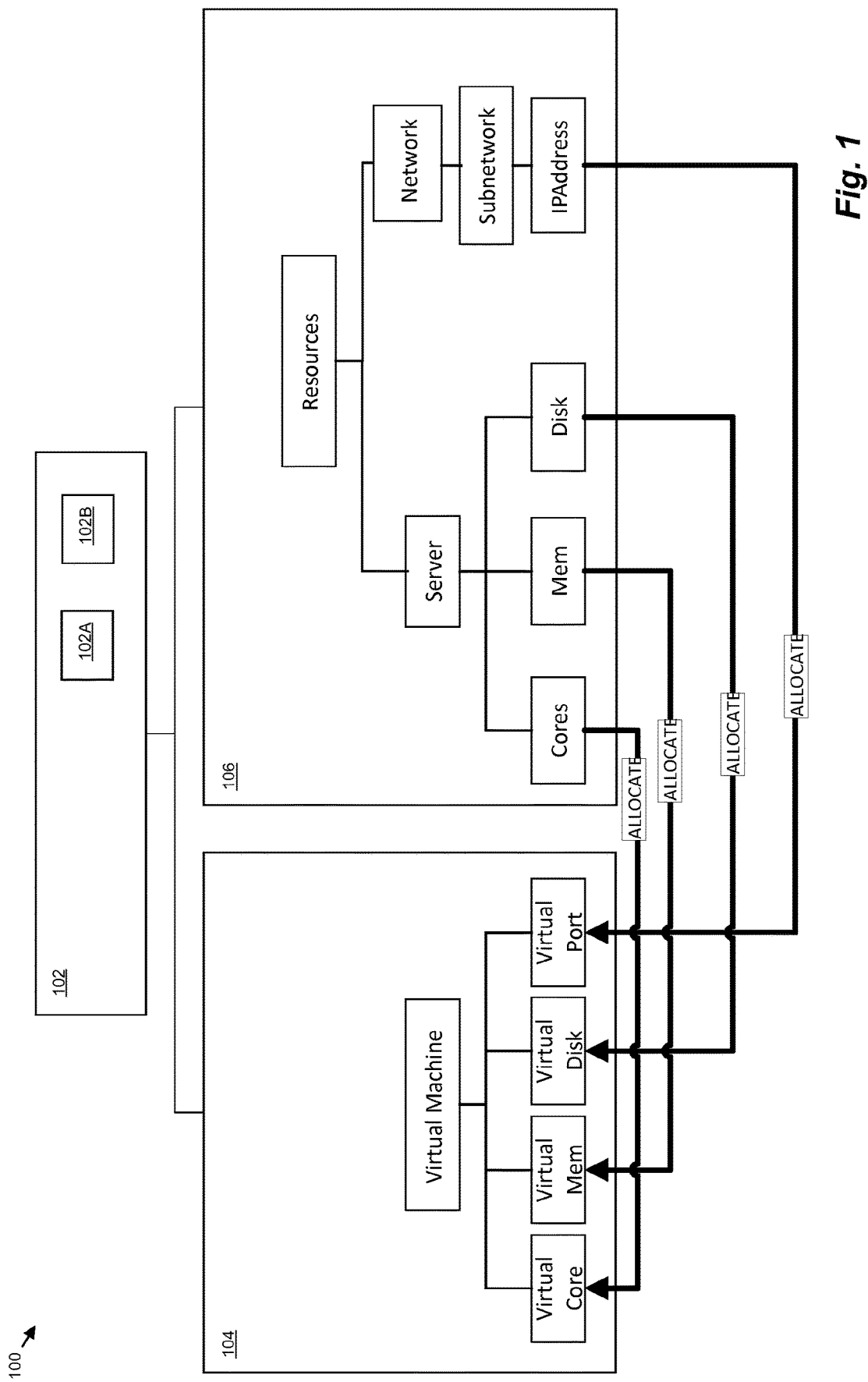
FIG. 1 shows a schematic diagram of a system for use in the allocation of resources in network function virtualization according to certain examples.

FIG. 1 shows a schematic diagram of a system 100 for use in the allocation (or 'assignment') of resources in network function virtualization (NFV) according to certain examples. System 100 comprises a controller 102 configured to control allocation of resources in NFV. Controller 102 comprises one or more processors 102A and/or memory 102B for carrying out such resource allocation tasks. In certain examples, controller 102 controls allocation of physical resources 106 to virtual resources 104.

In the examples depicted in FIG. 1, virtual resources 104 comprise one or more virtual machines comprising one or more virtual cores, one or more virtual memories, one or more virtual disks, and one or more virtual ports, but in other examples could include a subset of these and/or other virtual resources (not shown).

In the examples depicted in FIG. 1, physical resources 106 comprise one or more server cores, one or more server memories, one or more server disks, one or more network names, one or more subnetwork names, and one or more Internet Protocol (IP) addresses, but in other examples could include a subset of these and/or other physical resources (not shown).

In some examples, resource allocation reserves the resources for creating the complete virtualized network function. In some examples, physical resources are represented as artifact instance trees. In some examples, reservation is represented as an ALLOCATE relationship between physical and virtual resources as depicted in FIG. 1.

Certain examples described herein involve a system which, instead of looking for a fixed set of types and fixed set of resource candidates, it receives as an input, one or more specific resource allocation (or 'assignment') rules allowing each execution to search for different resources (based on the application needs) or in a different pool of resources.

Figure 2:
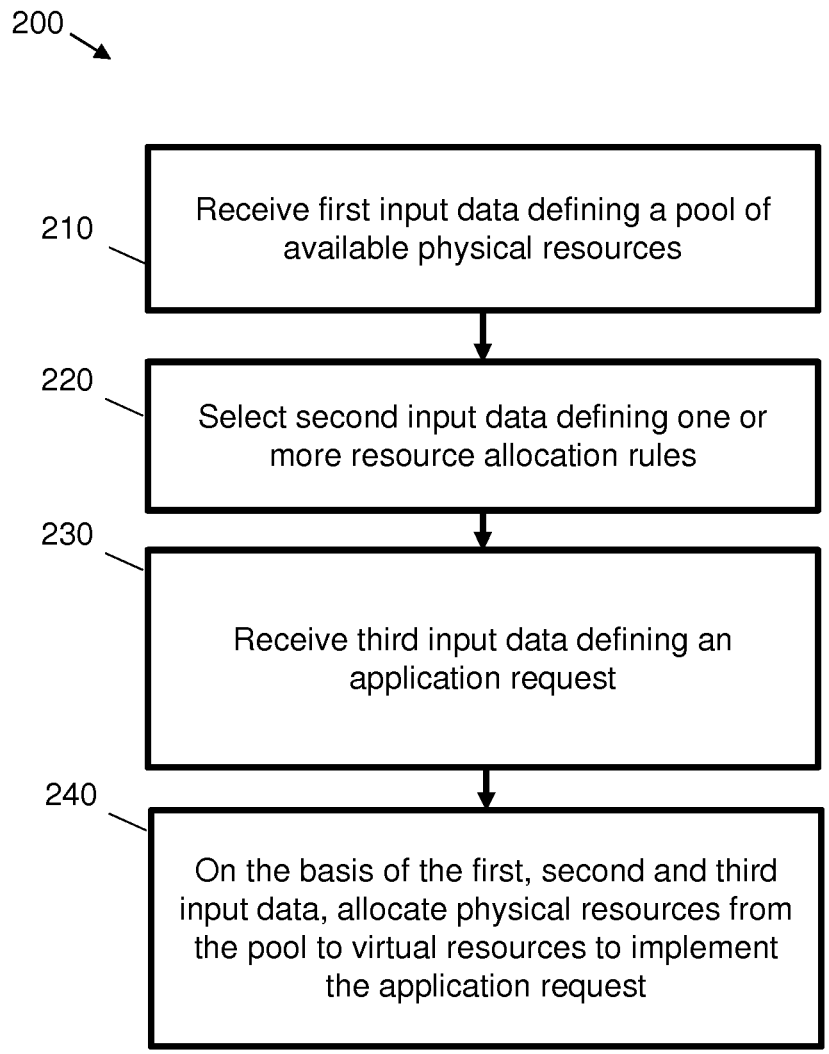
FIG. 2 is a flowchart showing operation of a system for use in allocating resources in network function virtualization according to certain examples.

FIG. 2 is a flowchart showing operation of a system 200 for use in allocating resources in network function virtualization according to examples.

System 200 comprises a controller (for example controller 102 of FIG. 1) comprising one or more processors (for example processor(s) 102A of FIG. 1) configured to, at block 210 receive first input data defining a pool of available physical resources. The pool may be comprised of physical resources distributed across different physical locations.

At block 220, the one or more processors are configured to select second input data defining one or more resource allocation rules.

At block 230, the one or more processors are configured to receive third input data defining an application request.

At block 240, the one or more processors are configured to, on the basis of the first, second and third input data, allocate physical resources from the pool to virtual resources to implement the application request.

In certain examples, the application request comprises a virtual network function instance identifier.

In certain examples, the one or more resource allocation rules define one or more rules for allocating physical resources to virtual resources.

In certain examples, the first input data defining a pool of available physical resources defines one or more of one or more server cores, one or more server memories, one or more server disks, one or more network names, one or more subnetwork names, and one or more Internet Protocol (IP) addresses.

In certain examples, the virtual resources comprise a virtual machine comprising one or more of virtual cores, virtual memory, virtual disks, and virtual ports.

In certain examples, the application request comprises at least one parameter associated with affinity of physical resources. In certain examples, the application request comprises at least one parameter associated with anti-affinity of physical resources.

In certain examples, the second input data defining one or more resource allocation rules is selected on the basis of application type or situation. In some such examples, the application type or situation comprises a normal deployment. In other such examples, the application type or situation comprises a disaster recovery.

Figure 3:
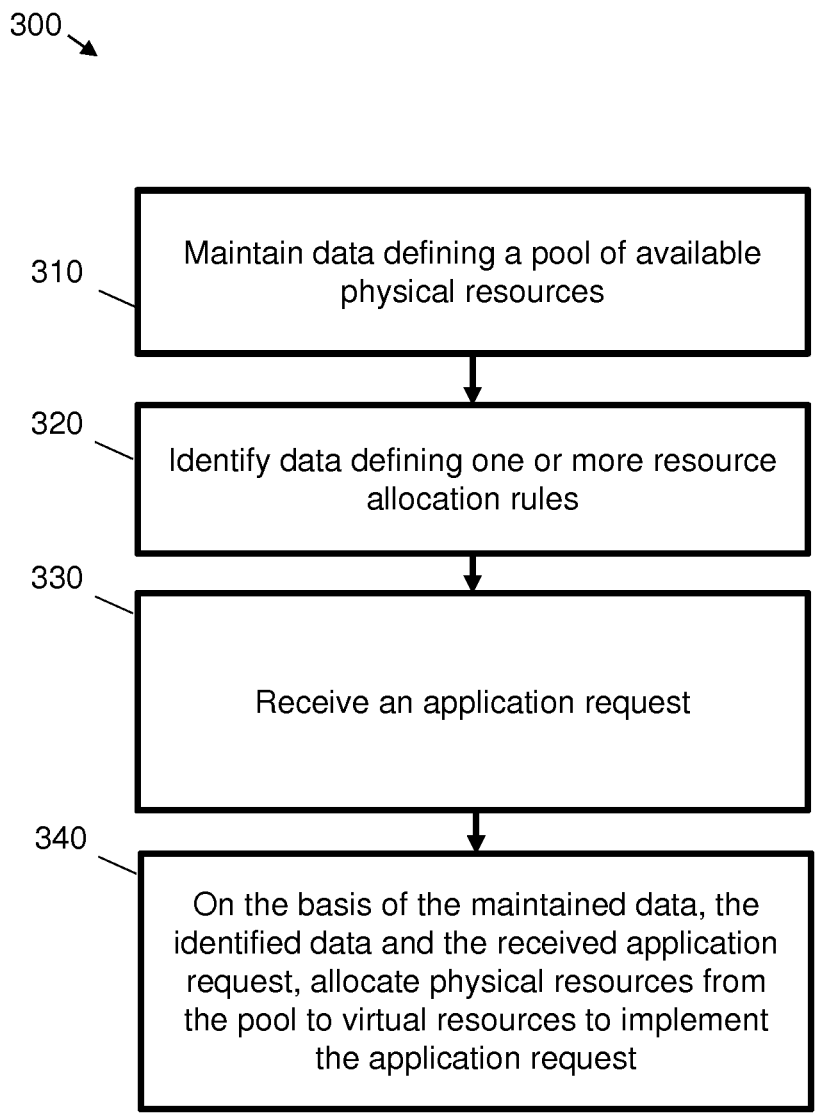
FIG. 3 is a flowchart showing a method of controlling allocation of resources in network function virtualization according to certain examples.

FIG. 3 is a flowchart showing a method 300 of controlling allocation of resources in network function virtualization according to examples.

Block 310 involves maintaining data defining a pool of available physical resources. The maintained data may for example be stored in a database.

Block 320 involves identifying data defining one or more resource allocation rules. The resource allocation rules may for example be stored in a database.

Block 330 involves receiving an application request.

Block 340 involves on the basis of the maintained data, the identified data and the received application request, allocating physical resources from the pool to virtual resources to implement the application request.

In certain examples, the identified data is identified on the basis of application type or situation. In some such examples, the application type or situation comprises a normal deployment. In other such examples, the application type or situation comprises a disaster recovery.

In certain examples, the maintained data defining a pool of available physical resources defines one or more of one or more server cores, one or more server memories, one or more server disks, one or more network names, one or more subnetwork names, and one or more Internet Protocol (IP) addresses.

In certain examples, the virtual resources comprise one or more of virtual cores, virtual memory, virtual disks, and virtual ports.

According to certain examples, resource allocation rules description supports grouping and targets, meanwhile the execution combines the resources and rules (for example affinity restrictions) of the application with the resource allocation rules in order to match candidates properly on the selected resource pool.

Certain examples involve computation based on information stored in a database, such that adding a new type of resource or modifying an existing resource allocation rule can be carried out easily in order to modify behavior.

According to an example, for a resource allocation rule that is trying to find virtual cores on a VM and type of hypervisor trying to match physical cores and type of hypervisor of a server, a parameter is added to the resource allocation rule to filter only servers marked as a certain type (for example servers of type GOLD).

In certain examples, resource allocation is computed based on application needs, resource allocation rules and the resource pool which allows examples to perform unique operations not present in other schedulers.

In some examples, each execution is made different. For example, GOLD servers may be looked for on a first execution, and if no GOLD servers are available, any type of server is looked for on a second execution.

In some examples, restrictions are added, removed and/or modified on demand. For example, in a first year, certain applications cannot run on a kernel-based virtual machine (KVM), but with subsequent versions in a second year, certain applications can run on KVM and EX.

Some examples take into consideration other application parameters such as affinity (for example where all cores are on the same server) or anti-affinity (for example where certain VMs are not on the same server).

According to some examples, resources are grouped based on arbitrary concepts that can be mapped as different tags, for example GOLD server, NEW server, YOUR server or server BELONGS TO A CERTAIN ENTITY, etc.

In some examples, a decision as to which resource allocation rule (or rules) to use is based upon on the application type or situation (for example normal deployment or disaster recovery).

In certain examples, a physical resource pool comprises a representation of the physical resources of the client infrastructure. In some examples, some of the resources are managed by a virtualized interaction manager (VIM), and in other examples, there are other physical resources such as networks or network elements which are not be managed by the VIMs.

Once a VM has been is allocated according to certain examples, this enables identification of a VIM where the VM can be created, a region, an availability zone and a host, and an Openstack™ network (or networks) where a VM can be connected.

Figure 4:
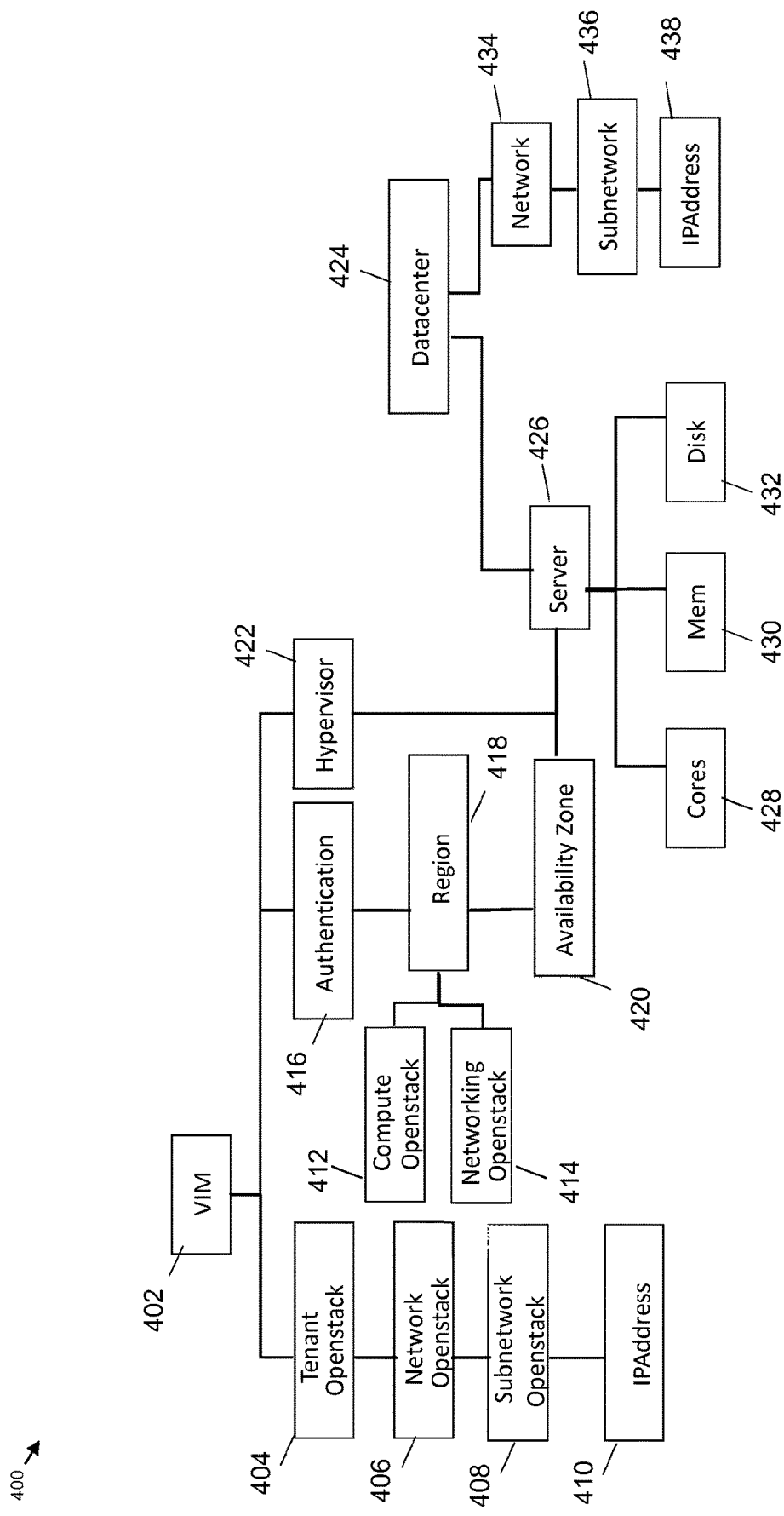
FIG. 4 shows a schematic diagram of a physical resource pool according to certain examples.

FIG. 4 shows a schematic diagram of a physical resource pool 400 according to certain examples. In the examples depicted in FIG. 4, physical resource pool 400 comprises a VIM element 402, a tenant Openstack™ element 404, a network Openstack™ element 406, a subnetwork Openstack™ element 408, one or more resource IP addresses 410, a compute Openstack™ element 412, a networking Openstack™ element 414, an authentication element 416, a region element 418, an availability zone element 420, a hypervisor element 422, a datacenter element 424, a server element 426, one or more server cores 428, one or more server memories 430, one or more server disks 432, a network element 434, a subnetwork element 436, and an IP address element 438. In other examples, physical resource pool 400 comprises a subset of these elements and/or comprises more than one of any of these elements (not shown).

In certain examples, each server is connected to a VIM through a hypervisor. In certain examples, credentials of the VIM are contained in an authentication artifact.

In certain examples, the number of cores, memories and disks of a server are indicated using an INFO.Amount attribute.

In certain examples, a network Openstack™ GENERAL.Name attribute indicates the name of a network a VM will be connected to. If the network does not exist in Openstack™, it will be created according to certain examples.

In certain examples, a subnetwork Openstack™ GENERAL.NAME attribute indicates the name of a subnetwork a VM will be connected to. If the subnetwork does not exist in Openstack™, it will be created according to certain examples. In some examples, a subnetwork specifies an IP address range within its attributes.

Certain examples involve trying to create the network if the STATUS is INSTANTIATED. In certain examples, the same applies for subnetworks. After a successful creation, the status is updated to ACTIVE according to certain examples. In some examples, for the next VM to be created that uses a given network, this network will not be created.

In certain examples, compute and networking artifacts store internal configuration that allows an appropriate JavaScript™ Object Notation (JSON) message to be composed depending on the type and version of the VIM: Openstack Icehouse™, Hewlett Packard Helion™, etc.

In certain examples, an attribute GENERAL.Name of artifacts AVAILABILITY_ZONE and SERVER allows selection of the server and availability zone in the VIM when creating the VM.

In some examples, an IPADDRESS artefact represents one single, fixed IP address. In other examples, an IPADDRESS artefact represents a number or range of dynamic host configuration protocol (DHCP) IP addresses.

Figure 5:
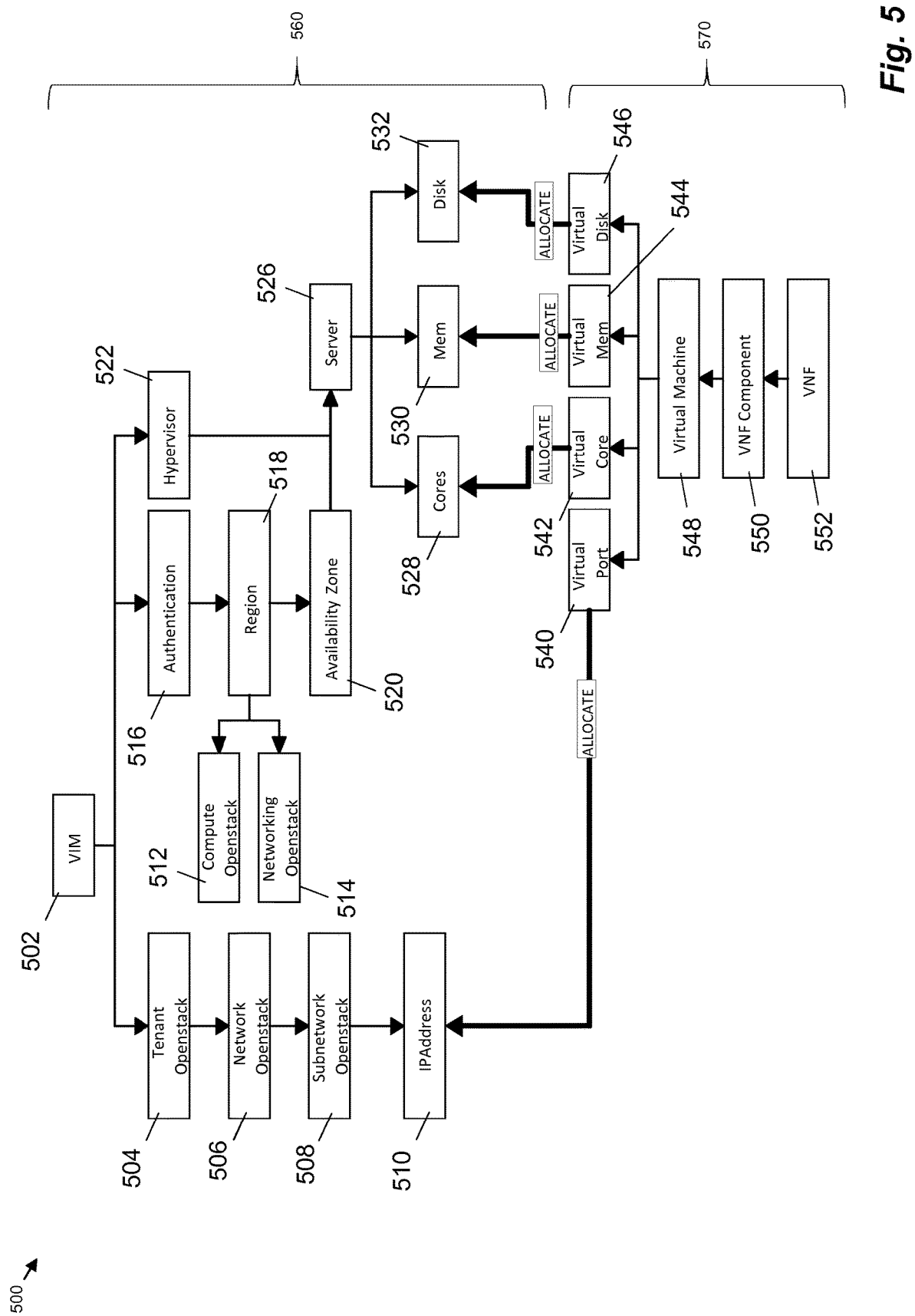
FIG. 5 shows a schematic diagram of allocation of resources according to certain examples.

FIG. 5 shows a schematic diagram of allocation of resources in a system 500 according to certain examples. System 500 may for example comprise a controller (for example controller 102 of FIG. 1) configured to control allocation of resources in NFV; the controller may for example comprise one or more processors (not shown) and/or memory (not shown) for carrying out such resource allocation tasks. In the examples depicted in FIG. 5, allocation of physical resources 560 to virtual resources 570 is carried out.

In the examples depicted in FIG. 5, physical resources 560 comprise a VIM element 502, a tenant Openstack™ element 504, a network Openstack™ element 506, a sub-network Openstack™ element 508, one or more physical resource IP addresses 510, a compute Openstack™ element 512, a networking Openstack™ element 514, an authentication element 516, a region element 518, an availability zone element 520, a hypervisor element 522, a server element 526, one or more server cores 528, one or more server memories 530, and one or more server disks 532. In other examples, physical resource pool 560 comprises a subset of these elements and/or comprises more than one of any of these elements (not shown).

In the examples depicted in FIG. 5, virtual resources 570 comprise a virtual network function 552, one or more virtual network function components 550, a virtual machine 548, one or more virtual ports 540, one or more virtual cores 542, one or more virtual memories 544, and one or more virtual disks 546, but in other examples could include a subset of these and/or other virtual resources (not shown).

Figure 6:
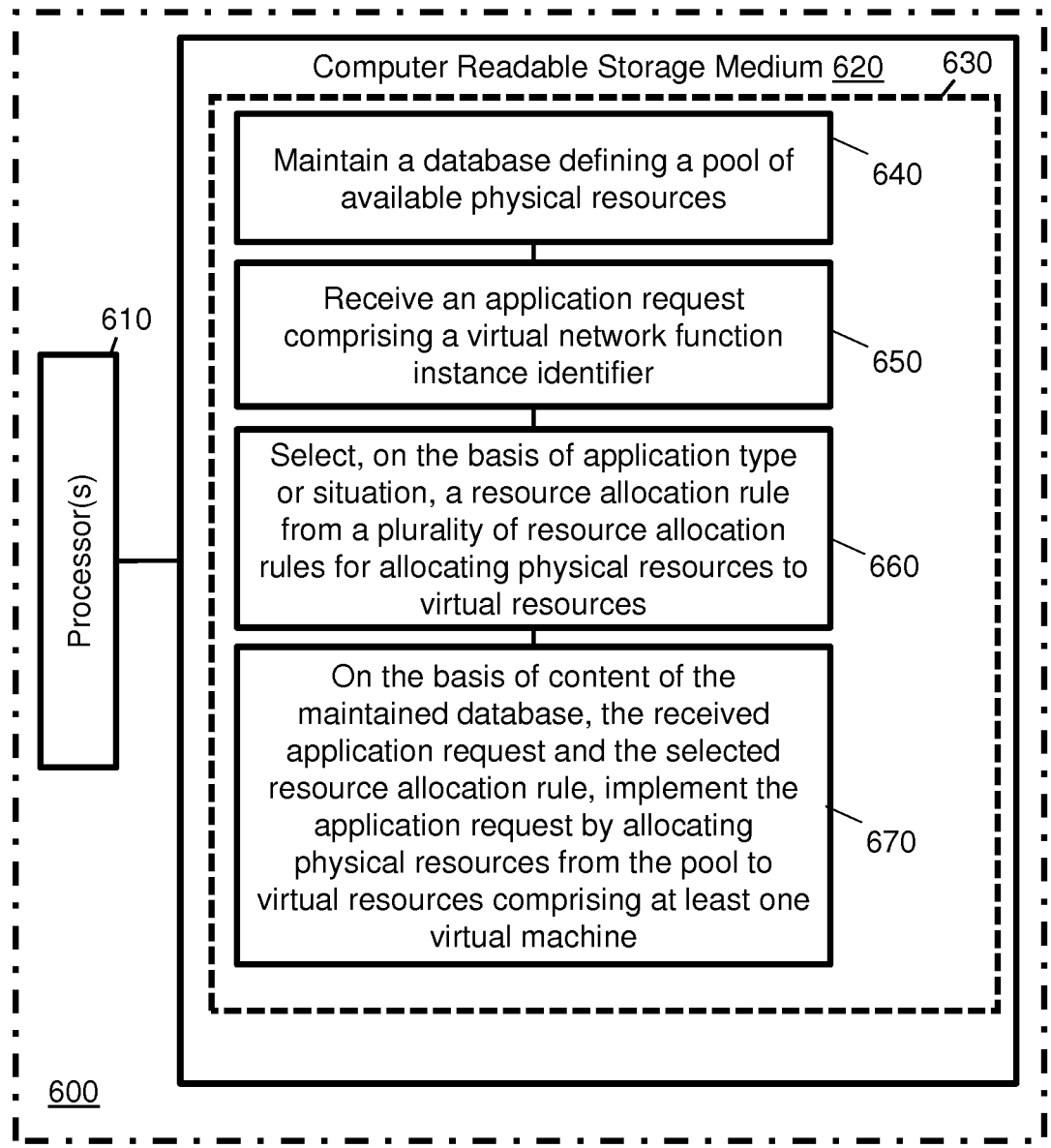
FIG. 6 is a schematic illustration of a processing device according to certain examples.

Certain system components and methods described herein may be implemented by way of machine readable instructions that are storable on a non-transitory storage medium. FIG. 6 shows an example of a device 600 comprising at least one processor 610 arranged to retrieve data from a computer-readable storage medium 620. The computer-readable storage medium 620 comprises a set of computer-readable instructions 630 stored thereon. The at least one processor 610 is configured to load the instructions 630 into memory for processing. The instructions 630 are arranged to cause the at least one processor 610 to perform a series of actions.

Instruction 640 is configured to cause the processor 610 to maintain a database defining a pool of available physical resources.

Instruction 650 is configured to cause the processor 610 to receive an application request comprising a virtual network function instance identifier.

Instruction 660 is configured to cause the processor 610 to select, on the basis of application type or situation, a resource allocation rule from a plurality of resource allocation rules for allocating physical resources to virtual resources; and Instruction 670 is configured to cause the processor 610 to, on the basis of content of the maintained database, the received application request and the selected resource allocation rule, implement the application request by allocating physical resources from the pool to virtual resources comprising at least one virtual machine.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A system comprising:
   a plurality of virtual machines;
   a pool of physical resources; and
   a controller comprising one or more processors and a non-transitory computer-readable storage medium comprising executable instructions which when executed by the one or more processors causes the system to perform operations comprising:
   creating the plurality of virtual machines;
   identifying a type of an application, wherein the application comprises an anti-affinity parameter indicating that certain virtual machines are not on the same physical resource;
   receiving first input data stored in a database which defines the pool of physical resources;
   selecting different second input data stored in the database which defines one or more resource allocation rules for allocating physical resources to virtual machines based on the type of the application;
   receiving different third input data which defines an application request;
   determining that the first type of physical resource based on a total input data comprising the first, second, and third input data is unavailable;
   searching the pool for a different second type of physical resource based on the total input data;
   allocating physical resources of the second type from the pool to the virtual machines;

removing a restriction of the system based on a determination that the application cannot be executed on a first type of virtual machine;
executing the application on one or more virtual machines of the first type; and
reserving a subset of the pool for creating a virtual network function instance.

2. The system of claim 1, wherein the first input data defines one or more of:
one or more server cores,
one or more server memories,
one or more server disks,
one or more network names,
one or more subnetwork names, and
one or more Internet Protocol (IP) addresses.

3. The system of claim 1, wherein the virtual machines comprise one or more of:
virtual cores,
virtual memory,
virtual disks, and
virtual ports.

4. The system of claim 1, wherein the operations are performed during a disaster recovery situation.

5. The system of claim 1, wherein the pool is distributed across different physical locations.

6. The system of claim 1, wherein the restriction is modified rather than removed.

7. The system of claim 1, wherein a subset of the pool is managed by and connected to a virtualized interaction manager (VIM) through a hypervisor, wherein credentials of the VIM are contained in an authentication artifact, and wherein a JavaScript Object Notation (JSON) message is composed based on a type and a version of the VIM.

8. A method comprising:
creating a plurality of virtual machines;
identifying a type of an application, wherein the application comprises an anti-affinity parameter indicating that certain virtual machines are not on the same physical resource;
receiving first input data stored in a database which defines a pool of physical resources;
selecting different second input data stored in the database which defines one or more resource allocation rules for allocating physical resources to virtual machines based on the type of the application;
receiving different third input data which defines an application request;
determining that the first type of physical resource based on a total input data comprising the first, second, and third input data is unavailable;
searching the pool for a different second type of physical resource based on the total input data;
allocating physical resources of the second type from the pool to the virtual machines;
removing a restriction based on determining that the application cannot be executed on a first type of virtual machine;
executing the application on one or more virtual machines of the first type; and
reserving a subset of the pool for creating a virtual network function instance.

9. The method of claim 8, wherein the first input data defines one or more of:
one or more server cores,
one or more server memories,
one or more server disks,
one or more network names,
one or more subnetwork names, and
one or more Internet Protocol (IP) addresses.

10. The method of claim 8, wherein the virtual machines comprise one or more of:
virtual cores,
virtual memory,
virtual disks, and
virtual ports.

11. The method of claim 8, wherein the method is performed during a disaster recovery situation.

12. The method of claim 8, wherein the pool is distributed across different physical locations.

13. The method of claim 8, wherein the restriction is modified rather than removed.

14. The method of claim 8, wherein a subset of the pool is managed by and connected to a virtualized interaction manager (VIM) through a hypervisor, wherein credentials of the VIM are contained in an authentication artifact, and wherein a JavaScript Object Notation (JSON) message is composed based on a type and a version of the VIM.

15. A non-transitory computer-readable storage medium storing instructions executed by one or more processors to execute the instructions and perform:
creating a plurality of virtual machines;
identifying a type of an application, wherein the application comprises an anti-affinity parameter indicating that certain virtual machines are not on the same physical resource;
receiving first input data stored in a database which defines a pool of physical resources;
selecting different second input data stored in the database which defines one or more resource allocation rules for allocating physical resources to virtual machines based on the type of the application;
receiving different third input data which defines an application request;
determining that the first type of physical resource based on a total input data comprising the first, second, and third input data is unavailable;
searching the pool for a different second type of physical resource based on the total input data;
allocating physical resources of the second type from the pool to the virtual machines;
removing a restriction based on determining that the application cannot be executed on a first type of virtual machine;
executing the application on one or more virtual machines of the first type; and
reserving a subset of the pool for creating a virtual network function instance.

16. The non-transitory computer-readable storage medium of claim 15, wherein the first input data defines one or more of:
one or more server cores,
one or more server memories,
one or more server disks,
one or more network names,
one or more subnetwork names, and
one or more Internet Protocol (IP) addresses, and
wherein the virtual machines comprise one or more of:
virtual cores,
virtual memory,
virtual disks, and
virtual ports.

17. The non-transitory computer-readable storage medium of claim 15, wherein the instructions are executed during a disaster recovery situation.

18. The non-transitory computer-readable storage medium of claim 15, wherein the pool is distributed across different physical locations.

19. The non-transitory computer-readable storage medium of claim 15, wherein the restriction is modified rather than removed.

20. The non-transitory computer-readable storage medium of claim 15, wherein a subset of the pool is managed by and connected to a virtualized interaction manager (VIM) through a hypervisor, wherein credentials of the VIM are contained in an authentication artifact, and wherein a JavaScript Object Notation (JSON) message is composed based on a type and a version of the VIM.

\* \* \* \* \*